United States Patent Office 3,328,922
Patented July 4, 1967

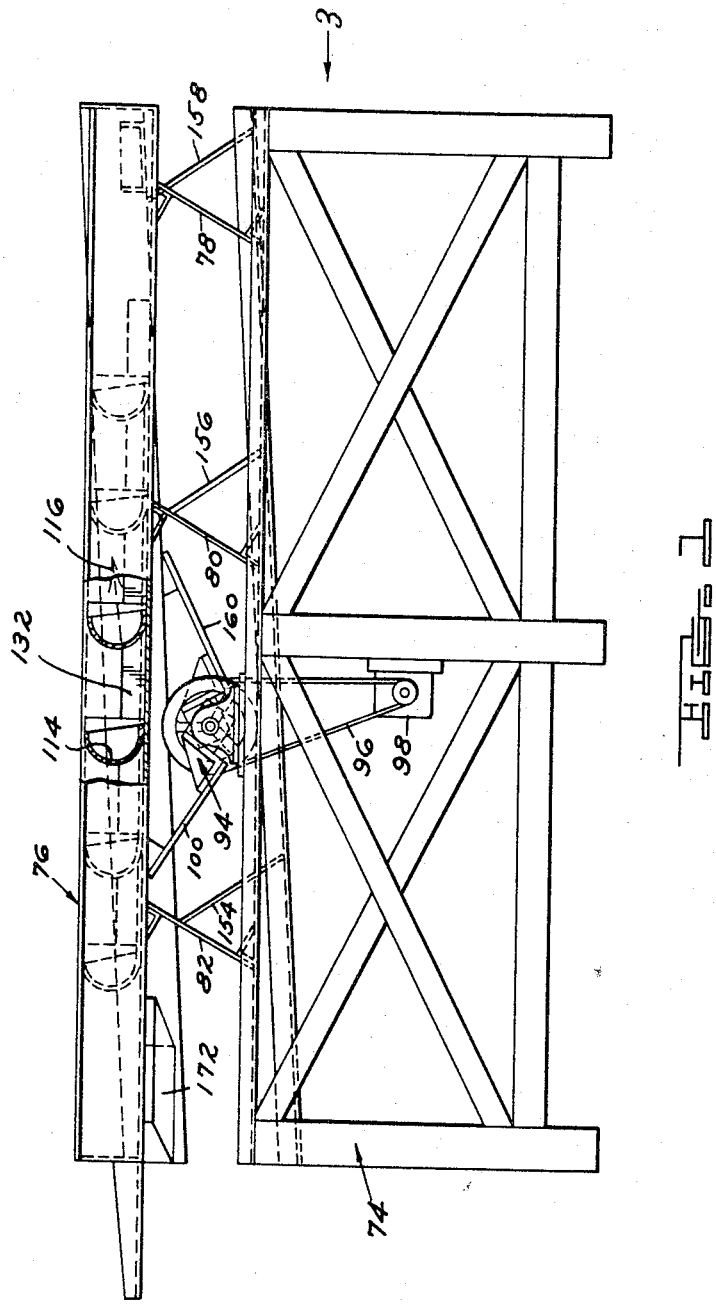

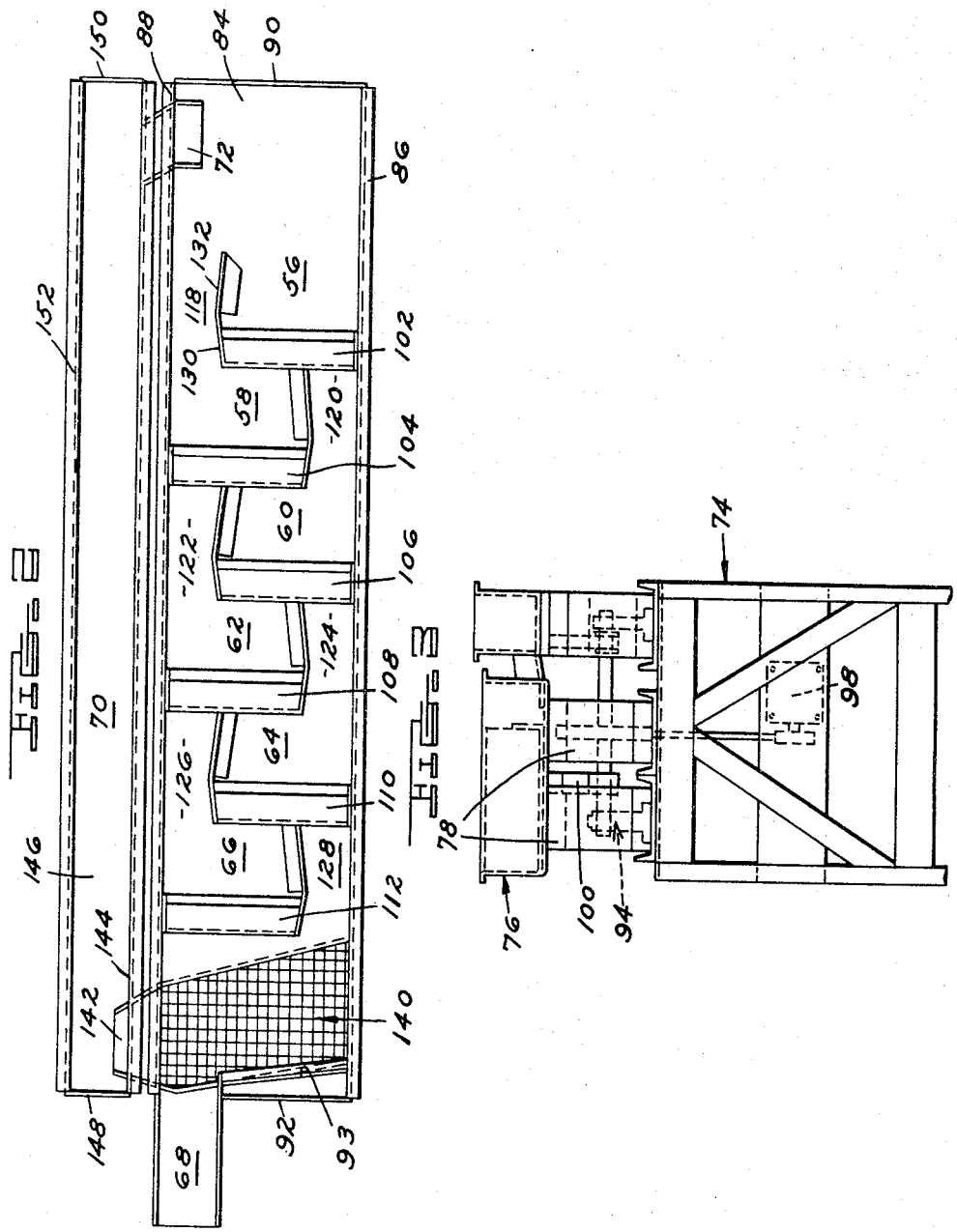

3,328,922
APPARATUS FOR SURFACE FINISHING ARTICLES
Peter P. Ruppe, 20 Hampton Road,
Grosse Pointe, Mich. 48236
Original application May 27, 1965, Ser. No. 459,302, now Patent No. 3,290,836, dated Dec. 13, 1966. Divided and this application Aug. 11, 1966, Ser. No. 571,933
5 Claims. (Cl. 51—163)

This application is a division of my copending application Ser. No. 459,302, filed May 27, 1965, now Patent No. 3,290,836, dated Dec. 13, 1966.

This invention pertains to the art of metal finishing. More particularly, it relates to ways and means for surface finishing articles as by deburring, scrubbing, abrading, or the like.

In fabricating metallic parts and the like, it frequently happens that burrs and rough surfaces are formed on the articles. One procedure for removing burrs and roughness of the surfaces of the articles is by barrel finishing. This procedure involves a barrel and abrasive particles inside of the barrel. The articles to be surface finished are placed in the barrel and the barrel is rotated on its axis whereby both abrasive particles and articles are tumbled together.

This procedure cannot be used, however, on many articles because of their fragile nature. The tumbling action involved is inherently too rough and hard on such articles.

In other instances such a procedure is not too effective because of the shape of the article to be finished. The abrasive particles in such instances do not appear to reach or at least to have any effect on burrs on edges somewhat shielded from the abrasive particles under tumbling conditions.

In both cases it has been necessary to manually deburr each individual article. This, of course, is inefficient and expensive. There is a need, therefore, for ways and means for mechanically deburring and surface finishing articles of a fragile nature and of odd shape.

An object of this invention is to provide ways and means for mechanically deburring or surface finishing articles regardless of their fragility and regardless of any irregularity in shape.

A specific object of this invention is to provide an apparatus for surface finishing articles, which involves gentle action.

Another specific object of this invention is to provide an apparatus for surface finishing articles which, under barrel finishing procedures, would remain relatively unaffected.

Another object is to provide an apparatus for continuous deburring of articles, as distinguished from a batch method such as the barrel finishing method. By using this apparatus articles are introduced into a vibrating bed of abrasive particles and relative movement between the articles and particles of the bed serves to deburr the articles, the articles moving in a circuitous path through the bed to finally emerge from a discharge point of the bed. The apparatus is such that articles may be continuously discharged from the discharge point of the bed, all without any interruption of the deburring process. Such portion of the abrasive particles as are discharged from the bed along with the articles, are collected and returned to the bed adjacent the article inlet to the bed.

In the apparatus of this invention there is employed the concept of a plurality of deburring zones containing abrasive particles and articles to be finished with the bin being connected with vibratory conveyor means structure. Furthermore, the downstream end of each zone toward which particles and articles are conveyed is provided with a deflector means comprising a curved path in the deburring zone. The deflector means is so constructed and arranged so that articles and particles may spill around an end of the curved wall for discharge from the deburring zone; and in a staggered arrangement of the zones the articles spill around the ends of the walls from one deburring zone to the next.

These and other concepts involved in this invention are present in the embodiment illustrated in the drawings which form a material part of the disclosure.

Turning to the drawings, it will be observed that:

FIG. 1 is a general side view of an article-finishing machine embodying the invention;

FIG. 2 is a top view of the machine of FIG. 1; and

FIG. 3 is an end view of the apparatus of FIG. 1 looking in the direction of arrow 3 therein.

The apparatus shown in the drawing is adapted to carry out what may be thought of as a continuous article-finishing method as distinguished from a batch or semibatch type method. The apparatus comprises, as shown in FIG. 2, a succession of article-finishing zones 56, 58, 60, 62, 64 and 66 which provide for successive beds of abrasive articles and particles. During operation of the apparatus the beds are subjected to vibratory conveying forces, and articles and particles overflow or spill from one bed to the next along the succession of beds from the upstream end 56 to the downstream end 66. Overflow or spillage from the downstream bed is collected and the articles and particles separated from each other, the articles discharging through chute 68 while the particles are returned by the transfer means 70 to be introduced to the upstream end of the apparatus through re-entry chute 72. The spillage results from having such a quantity of abrasive particles in the beds together with the articles to be surface finished, that upon subjecting the beds to the vibratory forces, the particles and articles overflow or spill from the beds as they move in their circulatory path through the beds.

More particularly the apparatus comprises a frame 74 upon which an elongate trough-like bin 76 is supported by angularly disposed pairs 78, 80 and 82 of leaf springs. The bin 76 has a bottom wall 84, parallel side walls 86 and 88 and end walls 90 and 92.

Connected to the bin for subjecting it to vibratory forces is vibratory mechanism including an eccentric drive 94 in driven engagement through a drive belt or the like 96 with motor 98 mounted on frame 74. A leaf spring 100 connects the eccentric to bin 76. Upon operation of the motor 98 the bin is subjected to a vibratory motion tending to move abrasive particles and articles to be surface finished disposed within the bin from the upstream end thereof (the right-hand end as viewed in FIG. 2) toward the downstream end (the left-hand end). The springs 78, 80 and 82 are preferably at an angle of 60 degrees. The amplitude of vibrating motion is preferably 5/16 of an inch and the frequency in a range from 600 to 2400 cycles per minute.

Within the bin are a succession of baffle means cooperating with the bottom and side walls of the bin to define finishing zones or beds of abrasive particles and articles to be surface finished. Such baffle means comprises a series of recirculating baffles 102, 104, 106, 108, 110 and 112 each of which has a concave face 114 as shown in FIG. 1. The baffles are generally semi-cylindrical in section. Each return baffle is secured along its lower edge to the floor 84 of the bin and cocked in a slight angle such that its concave face tends to open slightly upwardly as along arrow 116 in FIG. 1. The recirculating baffles are disposed in successive laterally staggered relation along the bin as shown in FIG. 2 to provide passageways as at 118, 120, 122, 124 and 126 around opposite sides of successive finishing zones. Such passageways allow overflow or spillage of articles and particles from one finishing zone or bed to be transferred to the next zone or bed in the succession. One end of each recirculating baffle juxtaposes a side wall of the bin while the opposite end is spaced from the other side wall by the width of the aforementioned passageways. Such opposite end of each recirculating baffle is closed by a secondary baffle comprising a first portion 130 juxtaposing such end of the recirculating baffle and a second portion 132 disposed at an angle to the first portion and extending upstream of the recirculating baffle to define with the recirculating baffle and the opposed side wall of the bin each of the finishing zones, such as zone 56.

Baffle portion 132 of each of the secondary baffles rises upwardly from the bottom wall or floor 84 of the bin a distance not quite but approaching one-half the rise of the recirculating baffles as clearly shown in FIG. 1. The overflow or spillage of abrasive particles and articles being finished occurs principally over this baffle portion 132 of each secondary baffle. The height and length of this portion therefore determines to a great extent the quantity of articles and particles that may be contained within each finishing zone.

As articles and particles spill over baffle portion 132 they fall to the floor 84 of the bin in the passageways 118, 120, etc., which areas of the floor provide a means for transferring particles and articles to the next successive finishing zone or bed.

At the downstream end of the succession of beds or finishing zones is the article and particle separator means comprising a screen 140 spanning an opening in the floor 84 of the bin and having a mesh sized such that abrasive particles will fall therethrough while articles will pass thereover and out article chute 68. A deflector wall 93 is provided along the downstream side of screen 140 to guide articles into chute 68. Below the screen is a particle transfer chute 142 disposed on a downwardly sloping incline and adapted to catch particles from separator 140 and convey them to the return transfer device or conveyor 70 for re-introduction to the opposite end of bin 76. The chute 142 may be secured to the bottom of bin 76 and empty through an opening in side wall 144 of conveyor 70.

Conveyor 70 includes a bottom wall 146, end walls 148 and 150, and another side wall 152. It slopes upwardly as shown so that its high end is disposed above the bottom wall 84 of bin 76. The particle re-entry chute 72 connected to conveyor 70 empties particles travelling up the conveyor back into the upstream end of the bin 76. Conveyor 70 is supported on framework 74 by leaf springs 154, 156 and 158 which are angled reverse of springs 78, 80 and 82 because the conveying motion to be imparted is the reverse of that in bin 76. Eccentric mechanism 94 is provided with an eccentric element and follower (not shown in detail) which are operatively connected to drive leaf 160 which is in turn connected to the conveyor 70. Consequently upon operation of motor 98, conveyor 70 is operated to convey abrasive particles from the lower end to the higher end for discharge through chute 72 back into the bin. The amplitude and frequency of conveyor 70 is such that it will return particles to the upstream end of the bin as rapidly as they pass through the collector.

For any given frequency and amplitude of vibratory movement imparted to bin 76, the rate at which articles to be finished will pass through the finishing operation is principally a function of the quantity or volume of articles and particles in the successive beds or finishing zones. This is so because the rate at which articles and particles spill out of the successive beds is a direct function of the quantity of particles and articles in the beds. If the particle level is high, the spillage is more rapid, and vice versa. Therefore if abrasive particles are added to the system in such quantity that taken together with a rate at which articles are fed to the system there is a high overflow rate between successive beds, the average length of time any of the articles will be subject to the surface finishing will be less than if the quantity of particles added or rate of article infeed are reduced. As a consequence the length of time that articles are subjected to the finishing operation becomes, for any given frequency and amplitude of vibratory conveying motion of the bin, a function of the rate at which articles and particles are fed into the upstream end of the succession of beds or finishing zones.

It has been found that if the proportion by volume of abrasive particles to articles to be finished is 1:1 that a very satisfactory finishing is obtained.

As heretofore mentioned the general direction of article and particle movement through the bin is from the upstream toward the downstream end thereof. During this general motion within each of the successive beds, the movement of articles and particles is deflected by the concave surface 114 of each of the recirculating baffles to cause the articles and particles to recirculate in each of the beds, such recirculation being counter the general direction of article and particle movement in the bed. As the articles recirculate in each of the beds they are gently turned over. During this circulatory travel of articles and particles in each of the beds some of the articles and particles spill out of the beds and are caught by the next successive bed in the succession of beds and the action repeats. In this fashion the articles and particles move through the system from the upstream end of the bin to the downstream end thereof. To give some idea of dimensions of a bin actually constructed and tested, and the rate at which articles were finished, a bin was constructed having a length of approximately 8½ feet and a width of 1½ feet and a depth of 6 inches. Articles of a suitable size for surface finishing in such size bin travelled from one end to the other thereof in about 30 minutes, and were thoroughly and properly surface finished.

A feature of advantage of this invention is that while the machines are in operation, the operator can tell by visual inspection the extent of finishing which has occurred and when substantially all of the articles have been surface finished.

Another feature of advantage of the machine is that the vibratory conveyor action thereof can be controlled so that agitation and movement of the articles to be finished are gentle. Yet, because of the relative motion between the abrasive particles and articles to be finished, the abrading, scrubbing, or deburring action is most effective.

Still another feature of advantage of this invention is that regardless of the shapes of the articles to be finished, all surfaces of the articles are contacted by the abrasive particles in following the teachings of this invention.

The machine of this invention is applicable not only with a bed of abrasive particles in the dry state, but also to a bed of abrasive particles suspended in a liquid to form a slurry. Generally speaking, any of the conventional deburring or surface finishing solids such as sand, silicon-carbides, and the like, may be used in practicing the teachings of this invention.

What is claimed is:

1. An apparatus for surface finishing articles which comprises: an elongated trough-like bin having a bottom and upstanding side walls, a succession of laterally staggered baffles extending transversely of the bin and upstanding from the bottom in spaced relation longitudinally thereof and alternately spaced at one end from, while connected at the opposite end to, first one side wall and then the other to define a succession of open end article finishing zones providing a generally zigzag article and particle pathway lengthwise of the bin, means for supporting and subjecting the bin to vibratory conveying forces extending generally lengthwise of the bin, and an article and particle separator in communication with that end of the bin toward which said conveying forces are directed.

2. The invention as defined in claim 1 characterized in that said baffles are vertically concave and in opposition to the direction of vibratory conveying forces, to provide a succession of open ended recirculating article finishing zones.

3. The invention as defined in claim 1 characterized in that a spill-over wall is provided at the open end of each article finishing zone and extends generally lengthwise of the bin between successive baffles and is of a height less than the baffles and over which articles and particles spill in passing from one zone to the next.

4. The invention as defined in claim 1 characterized in that each baffle is concave and faces angularly upwardly and in opposition to the direction of vibratory conveying forces.

5. The invention as defined in claim 1 characterized in that conveying means are provided communicating at one end with the article and particle separator to collect particles therefrom and communicating at the other end with the opposite end of the bin to return separated particles to such end for recycling therethrough.

References Cited

UNITED STATES PATENTS

| | | | |
|---|---|---|---|
| 2,222,776 | 11/1940 | Linke et al. | 209—3 |
| 2,222,777 | 11/1940 | Linke | 209—446 |
| 3,071,900 | 1/1963 | Balz | 51—163 |
| 3,073,078 | 1/1963 | Balz | 51—163 |
| 3,163,967 | 1/1965 | Moore | 51—163 |
| 3,187,473 | 6/1965 | Ruppe | 51—163 X |
| 3,187,474 | 6/1965 | Setzler | 51—313 |

LESTER M. SWINGLE, *Primary Examiner.*